US010685752B2

(12) United States Patent
Liszkai

(10) Patent No.: US 10,685,752 B2
(45) Date of Patent: Jun. 16, 2020

(54) STEAM GENERATOR WITH INCLINED TUBE SHEET

(71) Applicant: NuScale Power, LLC, Corvallis, OR (US)

(72) Inventor: Tamas Liszkai, Corvallis, OR (US)

(73) Assignee: NUSCALE POWER, LLC, Corvallis, OR (US)

(*) Notice: Subject to any disclaimer, the term of this patent is extended or adjusted under 35 U.S.C. 154(b) by 837 days.

(21) Appl. No.: 14/618,701

(22) Filed: Feb. 10, 2015

(65) Prior Publication Data

US 2016/0232996 A1 Aug. 11, 2016

(51) Int. Cl.

*G21C 15/257* (2006.01)
*G21C 1/32* (2006.01)
*G21D 1/00* (2006.01)
*F01K 5/00* (2006.01)
*G21C 13/036* (2006.01)
*G21C 13/04* (2006.01)

(52) U.S. Cl.

CPC .............. *G21C 15/257* (2013.01); *F01K 5/00* (2013.01); *G21C 1/32* (2013.01); *G21C 1/322* (2013.01); *G21D 1/006* (2013.01); *G21C 13/036* (2013.01); *G21C 13/04* (2013.01); *Y02E 30/40* (2013.01)

(58) Field of Classification Search

CPC ........ G21C 15/257; G21C 1/32; G21C 1/322; G21C 13/036; G21C 13/04; G21D 1/006; F01K 5/00
USPC .......................................................... 376/406
See application file for complete search history.

(56) References Cited

U.S. PATENT DOCUMENTS 3,394,051 A * 7/1968 Purdy .................... G21C 1/326 122/32
4,072,563 A 2/1978 McDonald
4,098,329 A 7/1978 Culver
5,102,616 A 4/1992 Gardner
5,331,677 A 7/1994 Matsuoka
5,349,617 A 9/1994 Gautier
6,357,114 B1 3/2002 Tang et al.
6,536,252 B1 3/2003 Waring
(Continued)

FOREIGN PATENT DOCUMENTS

CN 102272856 12/2011
CN 103077751 5/2013
(Continued)

OTHER PUBLICATIONS

European Patent Office, International Search Report and Written Opinion for PCT/US2015/060173, dated Mar. 21, 2016, 14 pages.

*Primary Examiner* — Jack W Keith
*Assistant Examiner* — Daniel Wasil
(74) *Attorney, Agent, or Firm* — Perkins Coie LLP

(57) ABSTRACT

A steam generation system may include a plurality of heat transfer tubes configured to circulate a secondary coolant of the steam generation system. The steam generation system may be thermally coupled to a reactor vessel, and the reactor vessel may be configured to house a primary coolant. Heat generated from within the reactor vessel may be transferred from the primary coolant to the secondary coolant. The steam generation system may further include an inclined tube sheet fluidly coupled to the plurality of heat transfer tubes. The inclined tube sheet may be attached to a wall of the reactor vessel in a non-horizontal orientation.

22 Claims, 10 Drawing Sheets

1200
1220
1230
1250
1300
1330
1360
1340
1390
1375
1310
1370
1350
1320

(56) References Cited

U.S. PATENT DOCUMENTS

| | | | | |
|---|---|---|---|---|
| 6,708,651 | B1 | 3/2004 | Sun | |
| 8,681,928 | B2 | 3/2014 | Steinmoeller et al. | |
| 8,744,035 | B1 | 6/2014 | Young et al. | |
| 9,997,262 | B2 | 6/2018 | Liszkai et al. | |
| 2009/0161812 | A1 | 6/2009 | Reyes, Jr. | |
| 2012/0076254 | A1 | 3/2012 | Malloy | |
| 2012/0111287 | A1 | 5/2012 | Williams et al. | |
| 2012/0263270 | A1 | 10/2012 | Malloy | |
| 2012/0275558 | A1 | 11/2012 | Cinotti | |
| 2013/0044853 | A1* | 2/2013 | Kim | G21C 1/32 376/384 |
| 2013/0121453 | A1 | 5/2013 | Shargots | |
| 2013/0279643 | A1* | 10/2013 | Groome | G21D 1/006 376/378 |

FOREIGN PATENT DOCUMENTS

| | | | |
|---|---|---|---|
| JP | 59131845 | A | 7/1984 |
| JP | S6148201 | U | 4/1986 |
| JP | 10332882 | A2 | 12/1998 |
| JP | 5525722 | B2 | 4/2014 |

* cited by examiner

STEAM GENERATOR WITH INCLINED TUBE SHEET

GOVERNMENT INTEREST

This invention was made with Government support under Contract No. DE-NE0000633 awarded by the Department of Energy. The Government has certain rights in this invention.

TECHNICAL FIELD

This disclosure generally relates to systems, devices, structures, and methods associated with a steam generation system.

BACKGROUND

Reactor performance, including the ability to efficiently generate electricity from a steam generator, may be influenced or otherwise affected by a variety of design considerations. For example, the number, length, and wall thickness of steam generator tubes may affect the decay heat removal and flow rate associated with a steam generator system. Similarly, the overall volume and wall thickness associated with a containment structure may determine, in part, a normal operating pressure or an allowable system pressure of a power plant.

In addition to design considerations related to efficiency, the various system components associated with the power plant must often meet strict safety requirements and regulatory codes. Power plants which operate with liquid and/or steam contained under pressure are typically designed to withstand pressures which may be in excess of normal operating conditions in order to keep the components from failing during an over-pressurization event or accident.

Invariably, the safety requirements and regulatory codes often result in a more robust design of the components, which tends to result in an increased amount of material used in the manufacture of certain components. As the size or weight of the components increase, this similarly increases the associated costs of manufacturing and transportation during construction of the reactor module, thus adding to the overall cost of the power plant and the electricity that it is designed to generate.

The present invention addresses these and other problems.

DETAILED DESCRIPTION

Figure 1:
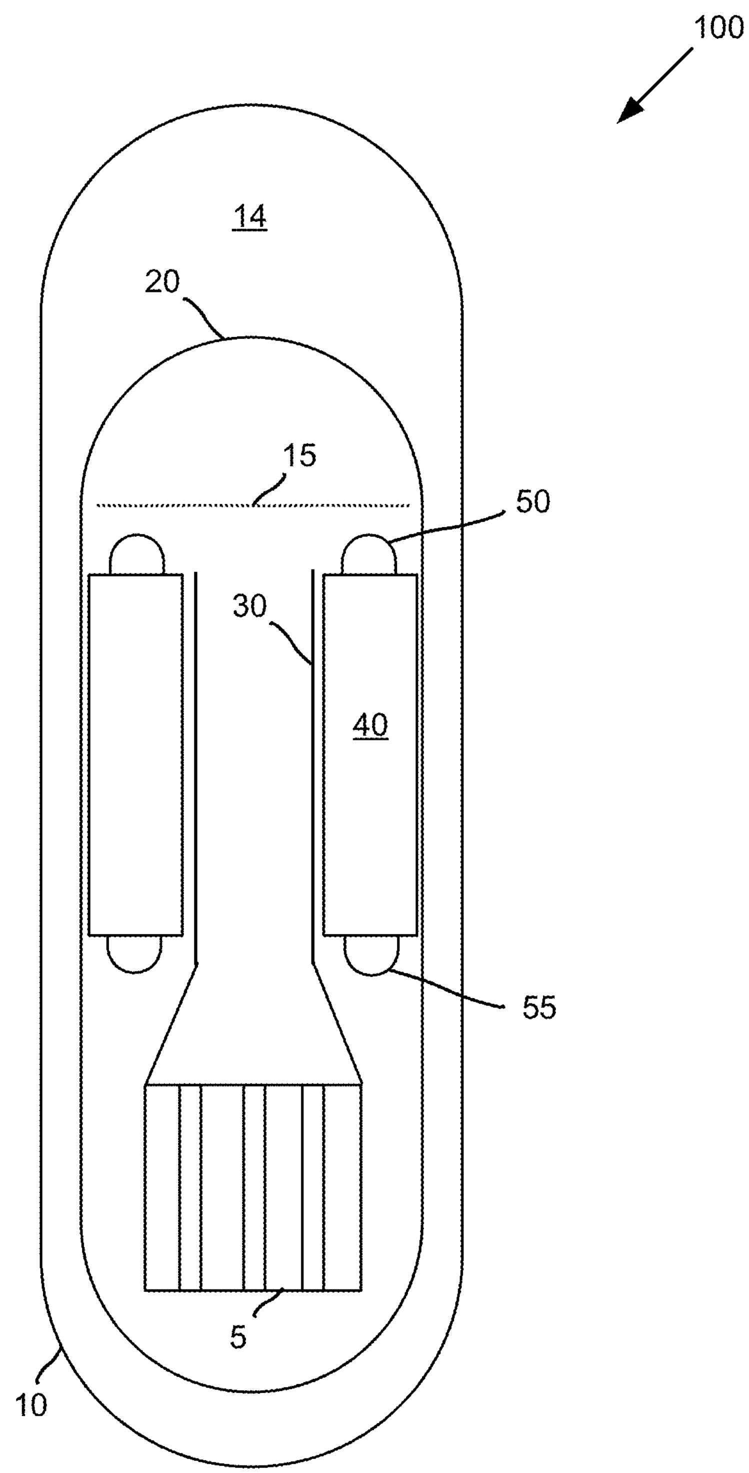
FIG. 1 illustrates an example nuclear reactor module.

FIG. 1 illustrates an example nuclear reactor module 100 comprising a containment vessel 10, a reactor vessel 20, and a heat exchanger 40. The Heat exchanger 40 may comprise one or more steam generators. A reactor core 5 may be positioned at a bottom portion of reactor vessel 20. Reactor core 5 may comprise a quantity of fissile material configured to generate a controlled reaction that may occur over a period of, for example, several years.

Containment vessel 10 may be configured to prohibit the release of primary coolant 15 contained within reactor vessel 20. In some examples, containment vessel 10 may be approximately cylindrical in shape, and/or may have one or more ellipsoidal, domed, or spherical ends. Containment vessel 10 may be welded or otherwise sealed to the environment, such that liquids and/or gases are not allowed to escape from, or enter into, containment vessel 10. In various examples, reactor vessel 20 and/or containment vessel 10 may be bottom supported, top supported, supported about its center, or any combination thereof.

An inner surface of reactor vessel 20 may be exposed to a wet environment comprising coolant and/or vapor, and an outer surface of reactor vessel 20 may be exposed to a substantially dry environment in some examples and/or modes of operation. Reactor vessel 20 may comprise and/or be made of stainless steel, carbon steel, other types of materials or composites, or any combination thereof.

Containment vessel 10 may substantially surround the reactor vessel 20 within a containment region 14. Containment region 14 may comprise a dry, voided, and/or gaseous environment in some examples and/or modes of operation. Containment region 14 may be at least partially filled with a gas and/or a fluid that increases heat transfer between reactor vessel 20 and containment vessel 10. Containment region 14 may comprise an amount of air, a noble gas such as Argon, other types of gases, or any combination thereof. In some examples, containment region 14 may be maintained at or below atmospheric pressure, for example at a partial vacuum. In other examples, containment region 14 may be maintained at a substantially complete vacuum. Any gas or gasses in containment vessel 10 may be evacuated and/or removed prior to operation of reactor module 100.

Certain gases may be considered non-condensable under operating pressures that are experienced within a nuclear reactor system. These non-condensable gases may include hydrogen and oxygen, for example. During an emergency operation, steam may chemically react with the fuel rods to produce a high level of hydrogen. When hydrogen mixes with air or oxygen, this may create a combustible mixture. By removing a substantial portion of the air or oxygen from containment vessel 10, the amount of hydrogen and oxygen that is allowed to mix may be minimized or eliminated.

Any air or other gases that reside in containment region 14 may be removed or voided when an emergency condition is detected. The gases that are voided or evacuated from the containment region 14 may comprise non-condensable gases and/or condensable gases. Condensable gases may include any steam that is vented into containment region 14.

During an emergency operation, whereas vapor and/or steam may be vented from reactor vessel 20 into containment region 14, any non-condensable gas (such as hydrogen) that may be vented or released into containment region 14 would not be of a sufficient amount as to develop a combustible gas mixture.

Accordingly, in some examples, substantially no hydrogen gas is vented into the containment region 14 together with the vapor, such that the levels and/or amounts of hydrogen together with any oxygen that may exist within the containment region 14 are maintained at a non-combustible level. Additionally, this non-combustible level of oxygen-hydrogen mixture may be maintained without the use of hydrogen recombiners. In some examples, separate vent lines from the reactor vessel 20 may be configured to remove non-condensable gases during start up, heat up, cool down, and/or shut down of the reactor.

Removal of convective heat transfer in air occurs generally at about 50 torr (50 mmHG) of absolute pressure, however a reduction in convective heat transfer may be observed at approximately 300 torr (300 mmHG) of absolute pressure. In some examples, containment region 14 may be provided with, or maintained below, a pressure of 300 torr (300 mmHG). In other examples, containment region 14 may be provided with, or maintained below, a pressure of 50 torr (50 mmHG). Containment region 14 may be provided with and/or maintained at a pressure level which substantially inhibits all convective and/or conductive heat transfer between reactor vessel 20 and containment vessel 10. A complete or partial vacuum may be provided and/or maintained by operating a vacuum pump, steam-air jet ejector, other types of evacuation devices, or any combination thereof.

By maintaining containment region 14 in a vacuum or partial vacuum, moisture within containment region 14 may be eliminated, thereby protecting electrical and mechanical components from corrosion or failure. Additionally, the vacuum or partial vacuum may operate to draw or pull coolant into the containment region 14 during an emergency operation (e.g. over-pressurization or over-heating event) without the use of a separate pump or elevated holding tank. The vacuum or partial vacuum may also operate to provide a way to flood or fill containment region 14 with coolant during a refueling process.

A vacuum within the containment region 14 may act as a type of thermal insulation during normal operation of the reactor module, thereby retaining heat and energy in reactor vessel 20 where it can continue to be utilized for power generation. As a result, less material insulation may be used in the design of reactor vessel 20. In some examples, a reflective insulation may be used instead of, or in addition to, conventional thermal insulations. Reflective insulation may be included on one or both of reactor vessel 20 or containment vessel 10. The reflective insulation may be more resistant to water damage compared to conventional thermal insulation. In addition, reflective insulation may not impede a transfer of heat from reactor vessel 20 as much as the conventional thermal insulation during an emergency condition. For example, an exterior stainless steel surface of reactor vessel 20 may come into direct contact with any coolant located in containment region 14.

One or both of reactor vessel 20 and containment vessel 10 may be exposed to coolant and/or water during certain modes of operation such as refueling, shutdown, or transport. In some examples, containment vessel 10 may be partially or completely submerged within a pool of water or other fluid coolant. Additionally, reactor core 5 may be partially or completely submerged within a primary coolant 15, such as water, which may include boron or other additives.

Heat transfer system 40 may comprise one or more steam generators and/or sets of heat transfer tubes. Additionally, heat transfer system 40 may comprise one or more upper plenum assemblies 50 and one or more lower plenum assemblies 55 configured to circulate secondary coolant comprising feedwater and/or steam through heat transfer system 40. Primary coolant 15 heated by reactor core 5 may travel up through a riser section 30 and transfer heat to the secondary coolant associated with heat transfer system 40.

Figure 2:
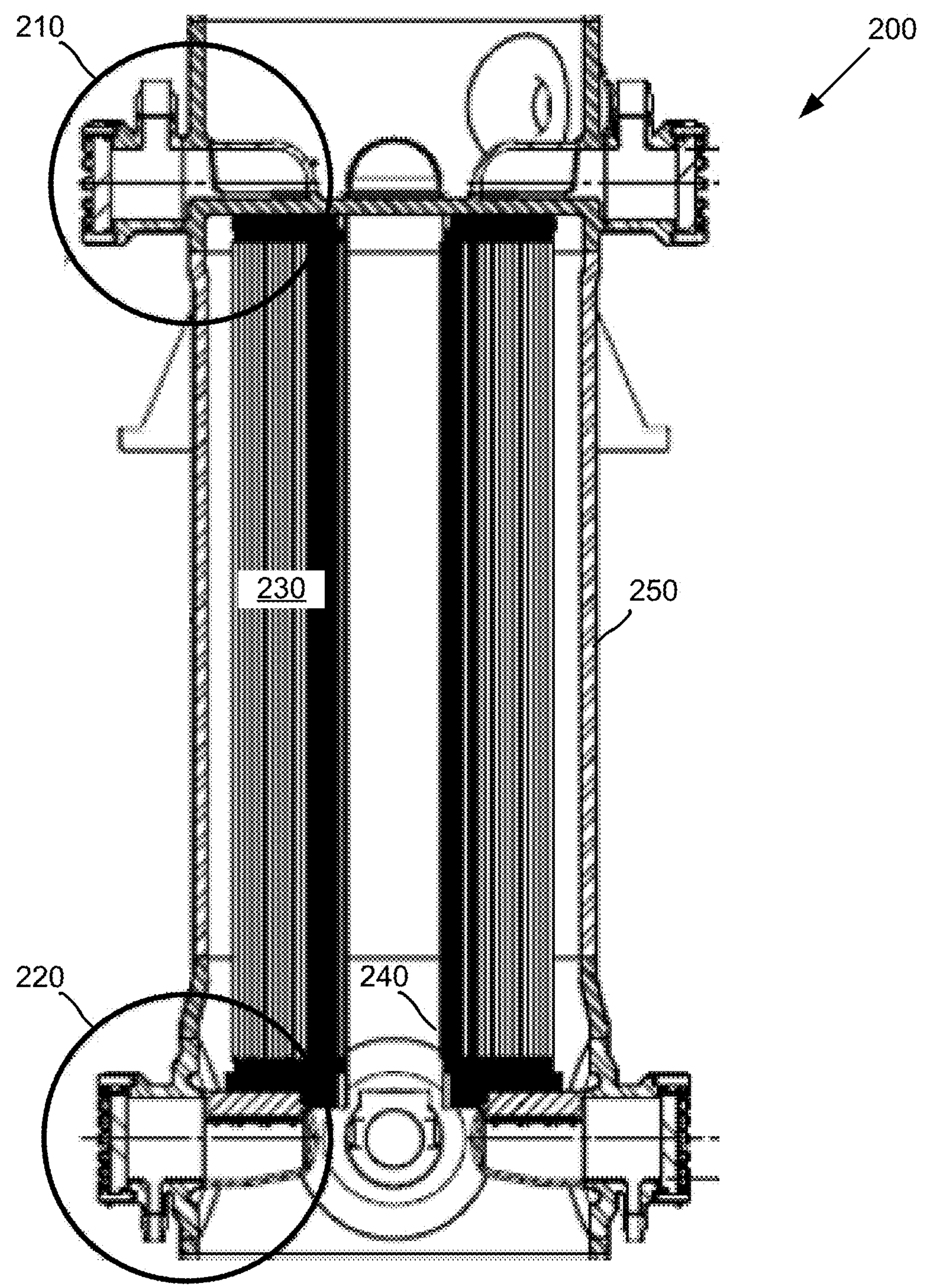
FIG. 2 illustrates an example steam generation system for a nuclear reactor module.

FIG. 2 illustrates an example steam generation system 200 for a nuclear reactor module. Steam generation system 200 may be configured to circulate secondary coolant comprising feedwater and/or steam through a plurality of heat transfer tubes 230. In some examples, the secondary coolant may pass through the steam generation system 200 and may become super heated steam due to a thermal heat transfer between the secondary coolant in heat transfer tubes 230 and the primary coolant in a reactor vessel 250. The secondary coolant in steam generation system 200 may be kept isolated from the primary coolant in reactor vessel 250 at all times, such that they are not allowed to mix or come into direct contact with each other.

Heat transfer tubes 230 may comprise a number of helical coils that wrap around a riser column 240 within reactor vessel 250. Heated primary coolant may rise through riser column 240 and make contact with the exterior surface of heat transfer tubes 230. In some examples, the primary coolant located within reactor vessel 250 may remain at an above atmospheric pressure, thus allowing the primary coolant to maintain a high temperature without vaporizing (i.e. boiling). As secondary coolant within heat transfer tubes 230 increases in temperature, the secondary coolant may begin to boil and/or turn into steam.

Vaporized coolant may be routed from an upper plenum assembly 210 of steam generation system 200 to drive one or more turbines. Upper plenum assembly 210 may be located at an outlet port of steam generation system 200. After condensing, the secondary coolant may be returned to a lower plenum assembly 220 of steam generation system 200. Lower plenum assembly 220 may be located at an input port of steam generation system 200. The feed ends of heat transfer tubes 230 may be routed to the lower feed plenum assembly 220 which may be radially located, at least partially, within the annular region between reactor vessel 250 and riser column 240.

Figure 3:
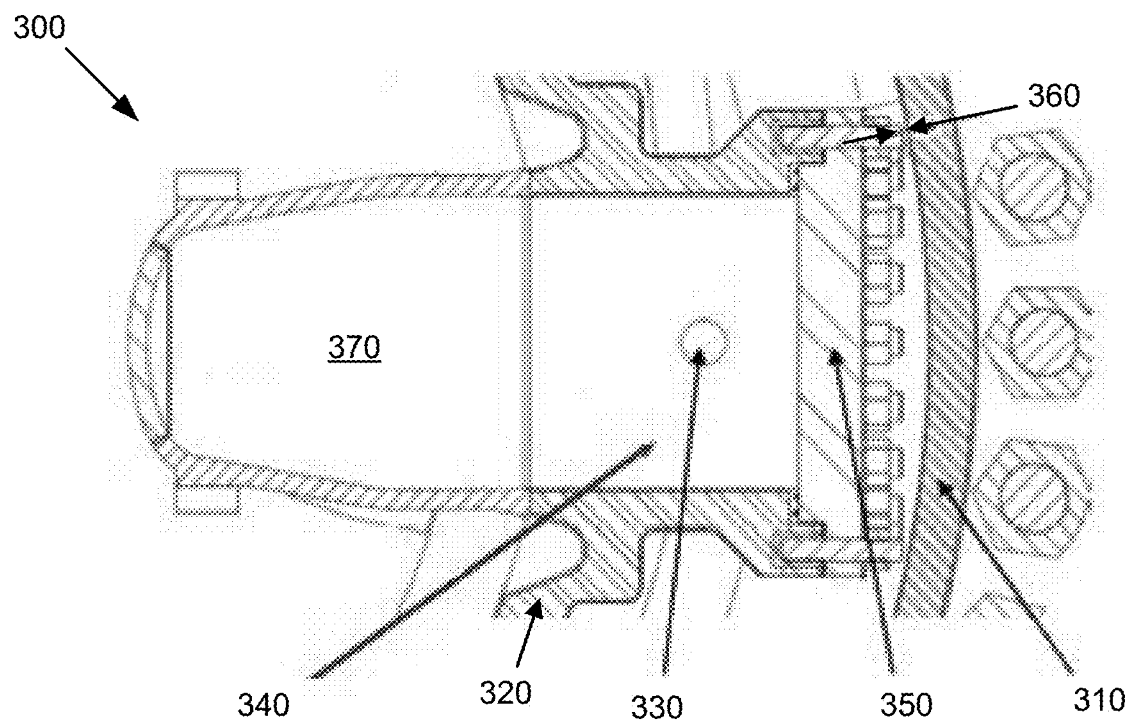
FIG. 3 illustrates a top view of an example lower plenum assembly.

FIG. 3 illustrates a top view of a lower plenum assembly 300. In some examples, lower plenum assembly 300 may be considered to operate similarly as the lower plenum assembly 220 of FIG. 2. Lower plenum assembly 300 may comprise an inlet 330 or feed nozzle configured to introduce secondary coolant into a feed plenum access port 340. Feed plenum access port 340 may be configured to provide access for the secondary coolant to pass into a feed plenum 370 located at least partially within a reactor vessel 320.

Additionally, lower plenum assembly 300 may comprise a cover plate 350 configured to provide access to the interior portion of feed plenum access port 340 and/or feed plenum 370. Lower plenum assembly 300 may be located substantially or entirely within a containment vessel 310. In some examples, reactor vessel 320 may be configured to be removed from containment vessel 310, and cover plate 350 may be removed from, and/or installed on, feed plenum access port 340 during one or more operations such as maintenance, inspection, and installation.

A nominal clearance 360 between containment vessel 310 and cover plate 350 and/or one or more bolts used to secure cover plate 350 may be sized to accommodate thermal growth, expansion due to pressure, manufacturing tolerances, seismic motion, installation, maintenance, inspection, accessibility, and/or handling considerations of reactor vessel 320 and/or the steam generator.

Figure 4:
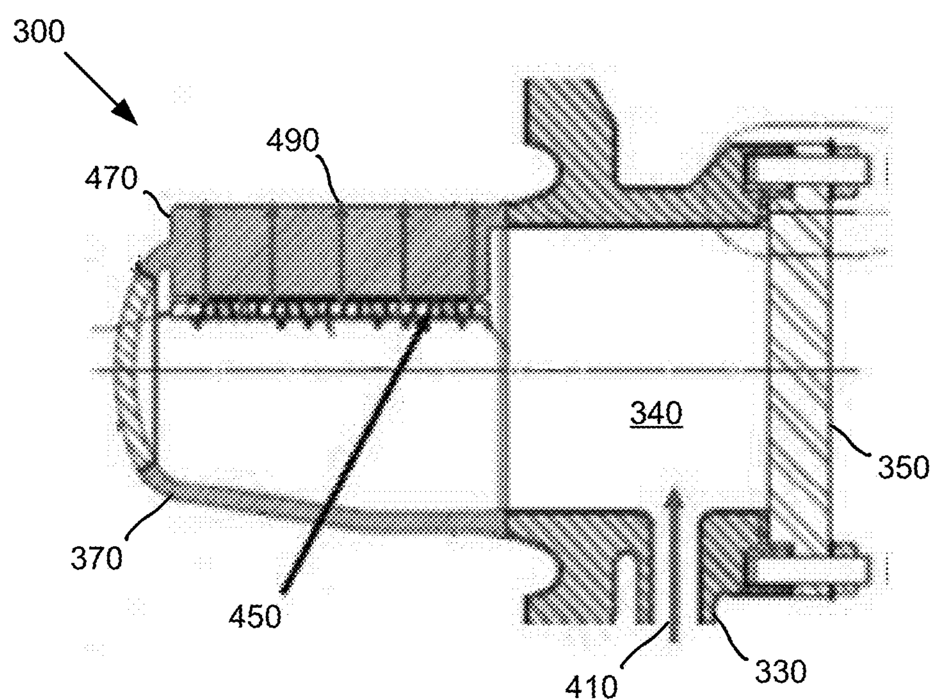
FIG. 4 illustrates a side view of the example lower plenum assembly of FIG. 3

FIG. 4 illustrates a side view of the lower plenum assembly 300 of FIG. 3. A feed flow 410 of secondary coolant from inlet 330 may be configured to enter into feed plenum access port 340 some distance from a tube sheet 470 where tube ends for a plurality of heat transfer tubes may be located. By attaching cover plate 350 to feed plenum access port 340, essentially all of feed flow 410 may be directed to tube sheet 470. Tube sheet 470 may comprise a plurality of through-holes 490 or channels through which the secondary coolant may pass through tube sheet 470 and into the heat transfer tubes. In some examples, the tube ends of the heat transfer tubes may be inserted into, and/or otherwise be fluidly coupled, mechanically coupled, or structurally coupled with, through-holes 490.

A flow control device 450 may be mounted next to, or attached with, tube sheet 470. Flow control device 450 may be configured to regulate, restrict, modify, diffuse, make uniform, or otherwise control the flow of secondary coolant that passes through tube sheet 470. In some examples, flow control device 450 may comprise a plate with flow restrictors corresponding to the number of through-holes 490.

Tube sheet 470 may be located one or more feet from inlet 330. This spatial separation may be configured to mitigate the flow velocity of secondary coolant impinging on the flow restrictors and mounting hardware of flow control device 450. Additionally, the spatial separation may also provide the opportunity for flow mixing, deceleration and improved uniformity of static pressure at the locations where secondary coolant enters the heat transfer tubes. In some examples, the combination of the spatial separation and a loss coefficient of the flow control device 450 may be configured to facilitate relatively uniform flow of secondary coolant into each heat transfer tube.

Figure 5:
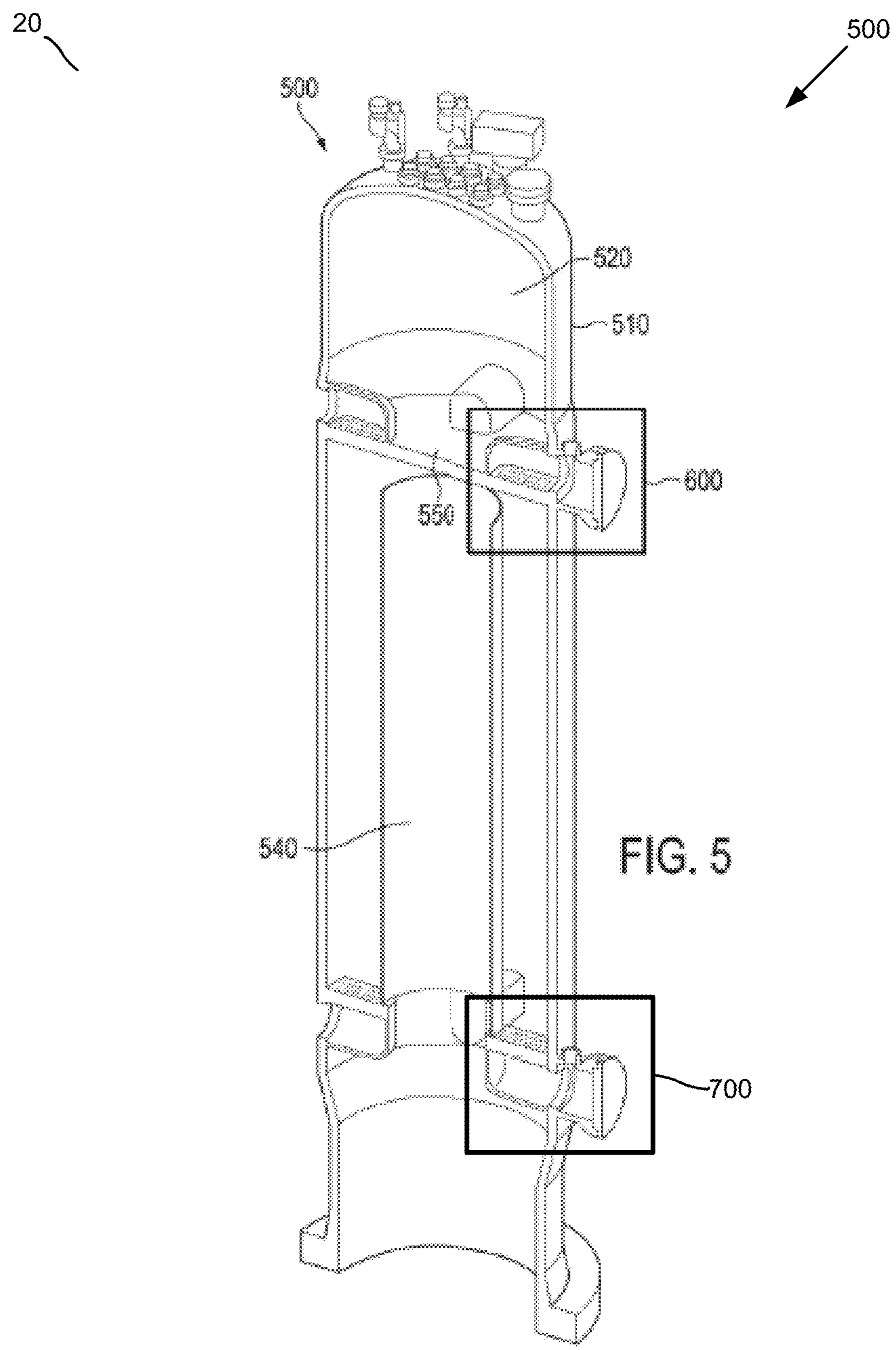
FIG. 5 illustrates an example reactor vessel system with an integral reactor vessel tube sheet.

FIG. 5 illustrates an example reactor vessel system 500 with an integral reactor vessel tube sheet 550. In some examples, the integral tube sheet 550 may perform some or all of the functions as associated with a pressurizer baffle plate, deflector shield, and/or a steam generator tube sheet. The integral tube sheet 550 may be configured to provide a compact space saving arrangement for the reactor vessel system 500.

In some examples, integral tube sheet 550 may comprise a full disk and/or full sheet located at or near the top portion of a reactor vessel 510. A pressurizer volume 520 may be located above the integral tube sheet 550 and bounded by the upper reactor vessel shell, container, and/or head. The integral tube sheet 550 may be configured to operate as a pressurizer baffle plate which separates the pressurizer fluid, located above integral tube sheet 550, from the reactor coolant system fluid, located below integral tube sheet 550. Integral tube sheet 550 may be configured to allow for an exchange of fluid volumes between the pressurizer volume 520 and the reactor coolant system. In some examples, the system 500 may not require a separate pressurizer baffle plate. Rather, integral tube sheet 550 may be integral with the pressurizer baffle plate.

A riser 540 may be configured to end and/or terminate below the integral tube sheet 550. A flow of reactor coolant system fluid up riser 540 may turn below the integral tube sheet 550 and descend down around the outside of riser 540 past a plurality of steam generator tubes. One or more heaters may be located in the pressurizer volume 520, for example between steam generator domes associated with one or more upper plenum assemblies 600. In some examples, the height of riser 540 and/or the height of control rods associated with system 500 may be reduced as compared to a reactor module which comprises separate baffle plates and tube sheets.

System 500 may comprise a thermal control system for reactor vessel 510. In some examples, integral tube sheet 550 may comprise a plate having a substantially circular shape that is attached to a wall of reactor vessel 510. Integral tube sheet 550 may be configured to divide reactor vessel 510 into an upper reactor vessel region and a lower reactor vessel region. The upper reactor vessel region may contain pressurizer volume 520 and upper plenum assemblies 600. The lower reactor vessel region may contain riser 540 and/or a reactor core submerged in primary coolant as well as one or more lower plenum assemblies 700. Integral tube sheet 550 may be configured to provide a liquid and/or thermal barrier between pressurizer volume 520 and the primary coolant located within the lower reactor vessel region.

Integral tube sheet 550 and/or upper plenum assembly 600 may be welded to reactor vessel 510 prior to installing heat transfer tubes into the secondary cooling system and/or steam generator. In some examples, one or more lower plenum assemblies 700 may be welded and/or installed later, after the heat transfer tubes have been installed. The heat transfer tubes may be individually lowered into an inverted reactor vessel 510, and inserted into the applicable steam plenum tube sheet hole of upper plenum assembly 600. When the assembly of the outermost column of tubes and associated tube supports is complete, assembly of the next tube column may be initiated, progressively working to the innermost column of tubes. The tube columns and associated tube supports may be sequentially installed, until all tubes and supports are in place.

After all the heat transfer tubes and supports are in place, at least a portion of lower plenum assembly 700 may be lowered over the assembled tube ends for final installation of the steam generator system. For example, the lower plenum assemblies 700 may comprise plenums that are welded to plenum access ports after the tube ends have been inserted into a corresponding tube sheet. Installation of lower plenum assemblies 700 after the tube ends have been inserted into the tube sheet may reduce or eliminate any plastic deformation of the heat transfer tubes that might otherwise occur if the tubes have to be pushed or otherwise moved to align the tube ends with fixed tube sheet holes. In some examples, a plurality of plenum assemblies, such lower plenum assemblies 700, may be separately welded to reactor vessel 510.

The feed end of the heat transfer tubes may be inserted into one or more tube sheets of lower plenum assemblies 700 in the annular region between the wall of reactor vessel 510 and riser 540. In some examples, two or more helical coil steam generators may occupy the annular region. Each steam generator may comprise two or more feed plenums and two or more steam plenums to which the tubes are connected. Additionally, each of the steam generators may comprise twenty-one columns of tubes or more. In some examples, there may be fewer than twenty-one columns. Successive columns of tubes may be configured to alternately wind clockwise and counterclockwise from the lower feed plenums, such as lower plenum assembly 700, to the upper steam plenums, such as upper plenum assembly 600. Additionally, each column of tubes may contain an equal number of tubes originating at each feed plenum, and thus an equal number of tubes from each of the steam generators. By way of further example, the outermost column of tube may comprise a total of eighty or more tubes; twenty or more tubes from each feed plenum and hence at least forty tubes from each steam generator.

Figure 6:
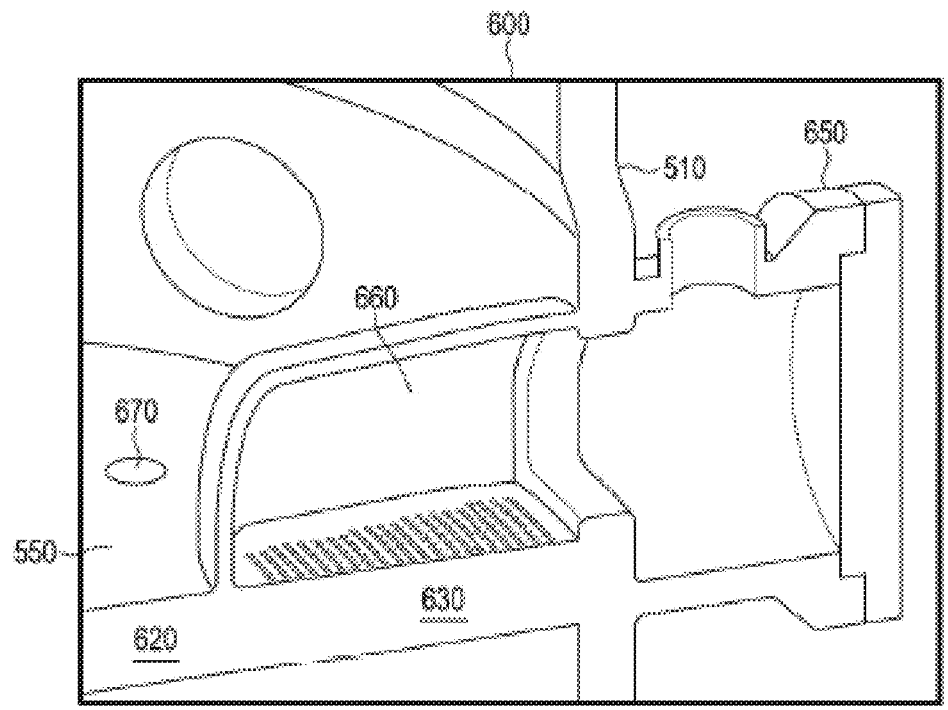
FIG. 6 illustrates an enlarged view of the example upper plenum assembly of FIG. 5.

FIG. 6 illustrates an enlarged view of the example upper plenum assembly 600 of FIG. 5. Integral tube sheet 550 may comprise a substantially horizontal plate attached to the wall of reactor vessel 510. The integral tube sheet 550 may be configured to provide a seal with the inner wall perimeter of reactor vessel 510. Additionally, integral tube sheet 550 may comprise two or more integrated portions, including a pressurizer baffle portion 620 and a steam generator tube sheet portion 630.

Pressurizer baffle portion 620 may be substantially bounded by the inner wall perimeter of reactor vessel 510 and one or more steam generator domes, such as steam generator dome 660. Steam generator dome 660 may be associated with a plenum/steam generator nozzle assembly 650. In some examples, steam generator tube sheet portion 630 may be located within and/or beneath steam generator dome 660. Steam generator dome 660 may be associated with one or more plenums that provide a passageway for a plurality of heat transfer tubes to pass through the wall of reactor vessel 510.

The plurality of heat transfer tubes may be connected to integral tube sheet 550 via a number of through-holes located in the integral tube sheet 550. The through-holes are illustrated as passing through steam generator tube sheet portion 630. Additionally, the one or more plenums associated with steam generator dome 660 may be welded and/or otherwise attached to integral tube sheet 550. The plurality of heat transfer tubes may be connected to integral tube sheet 550 below the one or more plenum and/or below steam generator dome 660. The heat transfer tubes may be configured to allow secondary coolant from a steam generation system to pass through integral tube sheet 550 and into the lower reactor vessel region of reactor vessel 510.

Integral tube sheet 550 may comprise a number of orifices 670, illustrated as passing through pressurizer baffle portion 620, that are configured to controllably allow primary coolant to pass through integral tube sheet 550 into the upper reactor vessel region of reactor vessel 510 and to re-circulate back into the lower reactor vessel region of reactor vessel 510. One or more orifices 670 may be configured, for example in a closed position, to prohibit the primary coolant from passing through integral tube sheet 550. In some examples, both the primary coolant and the secondary coolant pass through integral tube sheet 550 without becoming comingled and/or without being allowed to mix with each other.

The integral tube sheet 550 may comprise a solid plate. Additionally, the integral tube sheet 550 may comprise or substantially consist of a clad low alloy steel, SA-508 low alloy steel, stainless steel, other types of materials, or any combination thereof. In some examples, integral tube sheet 550 may be connected to reactor vessel 510 by a full penetration weld. The integral tube sheet 550 may be welded to a reactor vessel having a similar composition. Welding similar types of materials and/or composition may operate to minimize any thermal stresses which might otherwise develop during operation of the reactor vessel 510.

The weld between the integral tube sheet 550 and the reactor vessel 510 may be located several centimeters from the inner wall of the reactor vessel inner wall to provide space for the weld and/or to minimize distortion of the outermost tube holes due to welding. In some examples, a reactor vessel "bump-out," or area of increased diameter, may be provided to accommodate the welding area. An end of the heat transfer tubes may be moved towards the center of the reactor vessel and/or be bent to minimize or eliminate any additional amount of welding space. For example, the heat transfer tubes may be bent away from the reactor vessel wall so they meet the integral tube sheet 550 further inboard. A relatively large integral tube sheet 550 may provide for more flexibility as to how and where to terminate the heat transfer tubes within the plenum/steam generator nozzle assembly 650.

A relatively large access space on top of the integral tube sheet 550 may be configured to provide access for welding, component installation, equipment lay-down, and inspections. Access to the steam dome welds may be provided from two or more sides of the plenum, e.g., through the steam dome covers and/or through the pressurizer heater openings.

In some examples, the integral tube sheet 550 and associated tubes may be assembled inside the reactor vessel 510. Radial cantilever beams for the tube supports may be configured to fit under the integral tube sheet 550, and in some examples the support bars may be welded to the cantilever beam and/or to the integral tube sheet 550 directly underneath. Welding the support bars to the integral tube sheet 550 may reduce or eliminate pressure boundary welds and provide more rigidity to the support bars.

The integral tube sheet 550 may be configured to pass through to the outer diameter of the reactor vessel 510. In some examples, the integral tube sheet 550 may contain integral flanges that are welded to upper and lower vessel cylinders. The lower cylinder may be welded to the integral tube sheet 550 flange before inserting the heat transfer tubes. In some examples, the tubing operations may be performed inside the vessel. The integral tube sheet 550 may comprise a substantially cylindrical disc that is welded to a ring buildup on the inner diameter of reactor vessel 510. The welding may be completed prior to inserting the heat transfer tubes. In some examples, the integral tube sheet 550 may comprise an ellipsoidal, domed, concave, or hemispherical shaped lower surface adjacent to the lower reactor vessel region to facilitate the flow and/or recirculation of the primary coolant through the reactor core.

Figure 7:
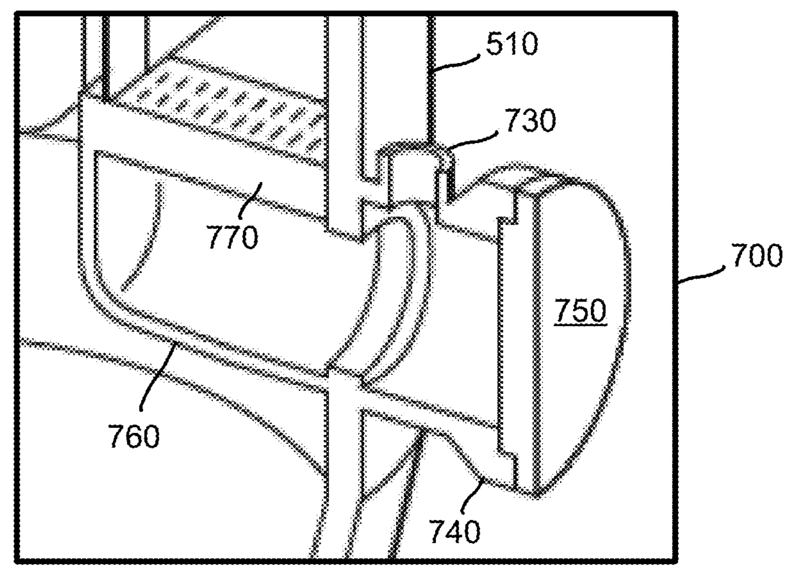
FIG. 7 illustrates an enlarged view of the example lower plenum assembly of FIG. 5.

FIG. 7 illustrates an enlarged view of the example lower plenum assembly 700 of FIG. 5. Lower plenum assembly 700 may comprise an inlet 730 or feed nozzle configured to introduce secondary coolant into a feed plenum access port 740. Feed plenum access port 740 may be configured to provide access for the secondary coolant to pass into a feed plenum 760 located at least partially within reactor vessel 510. A surface or face of a tube sheet 770 may be at least partially enclosed by feed plenum 760. Additionally, lower plenum assembly 700 may comprise a cover plate 750 configured to provide access to the interior portion of feed plenum access port 740 and/or feed plenum 760.

Feed plenum 760 may be welded to feed plenum access port 740 and/or to the wall of reactor vessel 510 after the heat transfer tubes are inserted into tube sheet 770. Feed plenum 760 and the associated weldment may comprise or be fabricated from Ni—Cr—Fe Alloy 690 (Alloy 690). In some examples, an Alloy 690 ring weld build-up may be applied on the inner surface of reactor vessel 510 to facilitate installation of lower plenum assembly 700.

Feed plenum access port 740 may comprise a steel alloy structure containing a flanged region which may be welded to reactor vessel 510. Feed plenum access port 740 may be clad with stainless steel. Inlet 730 may comprise a feed pipe having a diameter of several inches attached to feed plenum access port 740.

Figure 8:
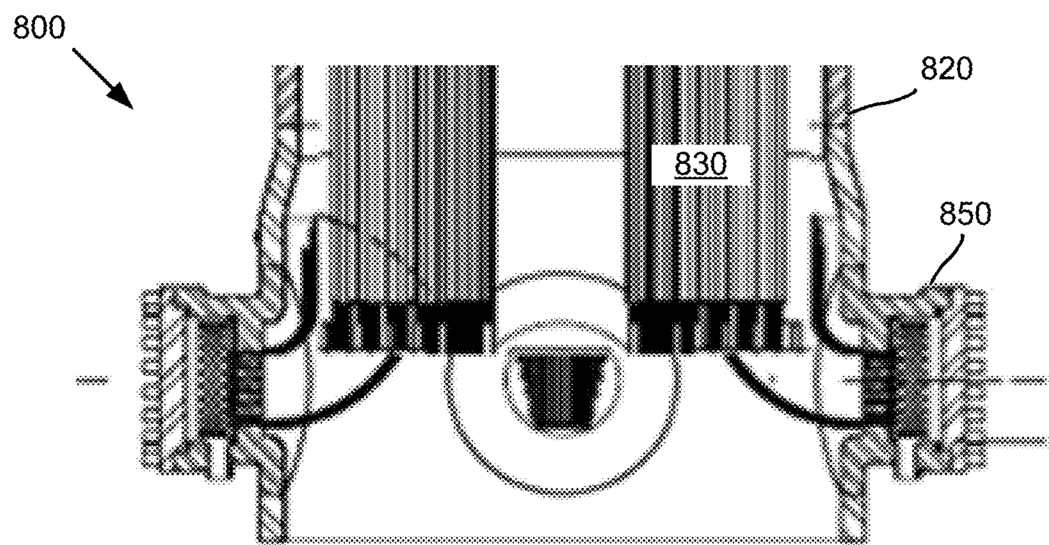
FIG. 8 illustrates a partial view of an example steam generation system comprising vertical tube sheets.

FIG. 8 illustrates a partial view of an example steam generation system 800 comprising one or more tube sheet assemblies 850. The one or more tube sheet assemblies 850 may be separately welded to a reactor vessel 820. Additionally, system 800 may comprise one or more upper tube sheet assemblies, similar to upper plenum assemblies 600 of FIG. 6. In some examples, the one or more upper tube sheet assemblies may comprise an integral tube sheet, similar to integral tube sheet 550 of FIG. 5.

Additionally, system 800 may comprise one or more steam generators 830 configured to route the feed ends of heat transfer tubes radially outward to tube sheet assemblies 850. Steam generators 830 may comprise helical coiled heat transfer tubes that occupy the annular region in an upper reactor vessel between the wall of reactor vessel 820 and a riser assembly.

Figure 9:
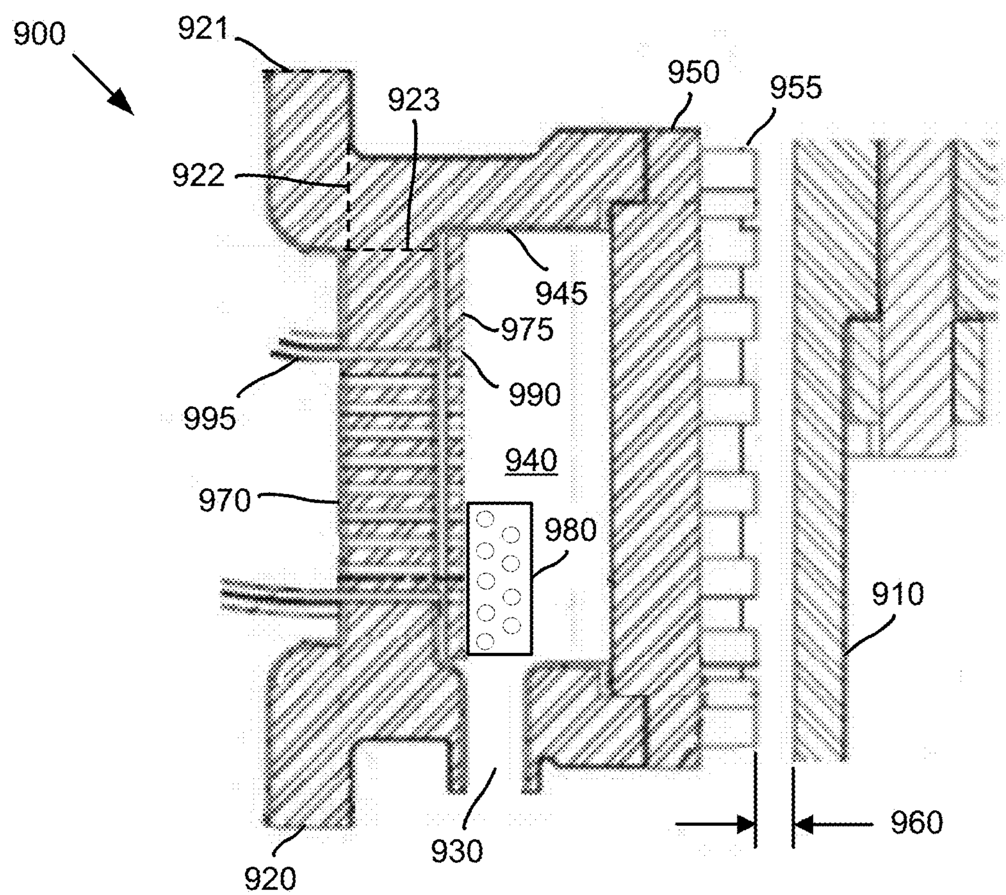
FIG. 9 illustrates a close up view of an example tube sheet assembly.

FIG. 9 illustrates a close up view of an example tube sheet assembly 900, which may be configured similarly as the one or more tube sheet assemblies 850 of FIG. 8. Tube sheet assembly 900 may comprise a substantially vertical tube sheet 970 with a plurality of through-holes 990 or channels through which secondary coolant may pass through vertical tube sheet 970 and into heat transfer tubes 995. Vertical tube sheet 970 may comprise a tube sheet inclined at approximately ninety degrees from the generally horizontal orientation of tube sheet 470 (FIG. 4).

Tube sheet assembly 900 may comprise an inlet 930 or feed nozzle configured to introduce secondary coolant into an access port 940. Access port 940 may be configured to provide access for the secondary coolant to pass into heat transfer tubes 995. A flow control device 975 may be located adjacent vertical tube sheet 970. In some examples, vertical tube sheet 970 may be several inches or up to approximately one half of a foot in thickness. Vertical tube sheet 970 may comprise a cladding material on one or both sides, e.g., on the side in which heat transfer tubes 995 may be inserted and/or on the side facing access port 940. Additionally, vertical tube sheet 970 may be substantially circular in shape.

In some examples, flow control device 975 may comprise one or more flow restrictors attached, inserted, or otherwise formed in one or more mounting plates attached to a face of the tube sheet. The flow restrictors may be used in the inlet of each heat transfer tube 995 and/or through-hole 990 to stabilize flow rate through the tubes.

Compared to inlet 330 of FIG. 4, inlet 930 may be located fairly close to the face of tube sheet 970. In some examples, the inlet feed flow velocity of the coolant may impinge almost directly on the bottom edge of flow control device 975 and cross over its surface. A perforated flow distributor 980, which may be attached to flow control device 975, may be utilized to reduce local velocities at flow control device 975 and provide for more uniform flow velocity near the tube inlets. Flow distributor 980 may be located in the bottom portion of access port 940 near inlet 930.

Additionally, tube sheet assembly 900 may comprise a cover plate 950 configured to provide access to the interior portion of access port 940. Tube sheet assembly 900 may be located substantially or entirely within a containment vessel 910. In some examples, cover plate 950 may be removed from, and/or installed on, access port 940 during one or more operations such as maintenance, inspection, and installation. A nominal clearance 960 between an inner surface of containment vessel 910 and cover plate 950, or between the inner surface of containment vessel 910 and one or more bolts 955 used to secure cover plate 950 to access port 940, may be sized to accommodate thermal growth, expansion due to pressure, manufacturing tolerances, seismic motion, installation, maintenance, inspection, accessibility, and/or handling considerations of reactor vessel 920 and/or heat transfer tubes 995. In some examples, nominal clearance 960 may be approximately one half inch.

Tube sheet assembly 900 and/or vertical tube sheet 970 may be attached and/or welded to a reactor vessel wall 920. Tube sheet assembly 900 may be welded to reactor vessel wall 920 at a first weld surface 921. First weld surface 921 may comprise a relatively large diameter weld on a vertical surface of reactor vessel wall 920. In some examples, tube sheet assembly 900 may be welded to the reactor vessel at an alternative second weld surface 922. Second weld surface 922 may comprise a relatively smaller diameter weld to an access port wall 945. In still further examples, vertical tube sheet 970 may be welded to access port wall 945 at an alternative third weld surface 923.

Heat transfer tubes 995 may be configured to transition from a steam generator assembly to vertical tube sheet 970. A minimum tube bend radius of nine inches or less may be specified over the transition length. In some examples, the minimum tube bend radius may be approximately seven inches. The minimum tube bend radius may be configured to limit tube bending residual tensile stress, to reduce the potential for stress corrosion cracking in service, to facilitate meeting the tubing ovality limit for structural integrity, and/or to facilitate tube inspection.

Approximately one inch of heat transfer tubes 995 may be configured as a straight portion of tube that extends out of vertical tube sheet 970 with a fully inserted heat tube. The straight length of tube may be configured to ensure that the start of the transition bend is located some distance from the face of vertical tube sheet 970 where the heat transfer tubes 995 may be subject to residual stresses due to tube expansion during installation/insertion of the tubes into through holes 940. Additionally, the straight length of tube may be configured to facilitate inspection of this expansion transition region of heat transfer tubes 995.

Figure 9A:
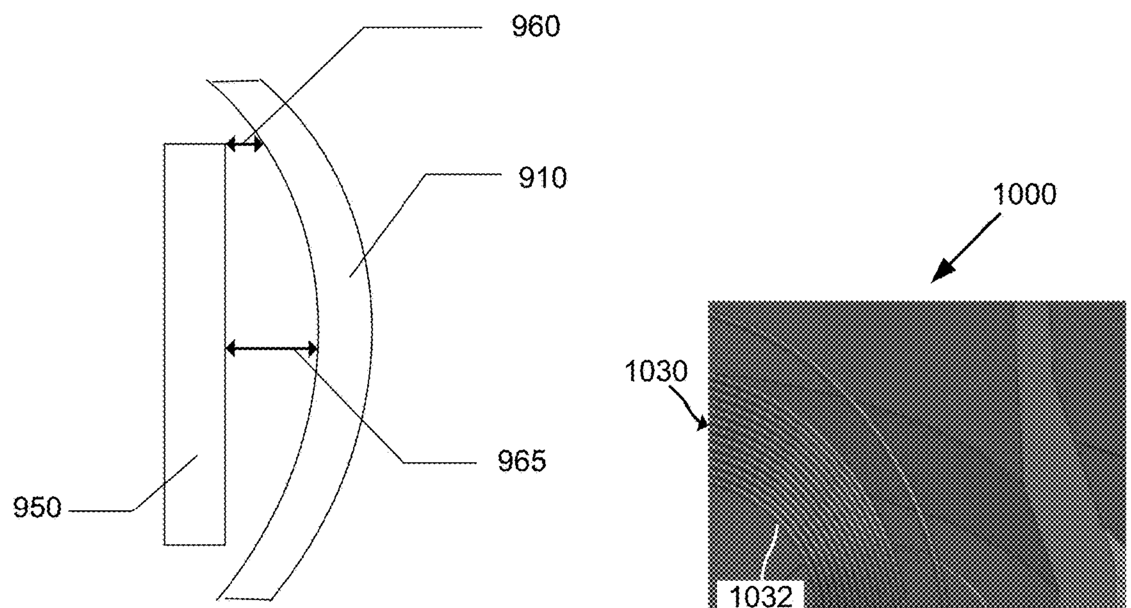
FIG. 9A illustrates a simplified partial top view of the example tube sheet assembly of FIG. 9

FIG. 9A illustrates a simplified partial top view of the example tube sheet assembly 900 of FIG. 9. Containment vessel 910 is shown as including a curved inner surface, and cover plate 950 is shown as a generally vertical or flat plate. Accordingly, in some examples the nominal clearance 960 between cover plate 950 and containment vessel 910 may be understood as existing at or near the side of cover plate 950. For example, the nominal clearance 960 may be less than a clearance 965 taken from the approximate center of cover plate 950 as a result of the curved inner surface of containment vessel 910 being further from the center as compared to the side of cover plate 950.

Figure 10:
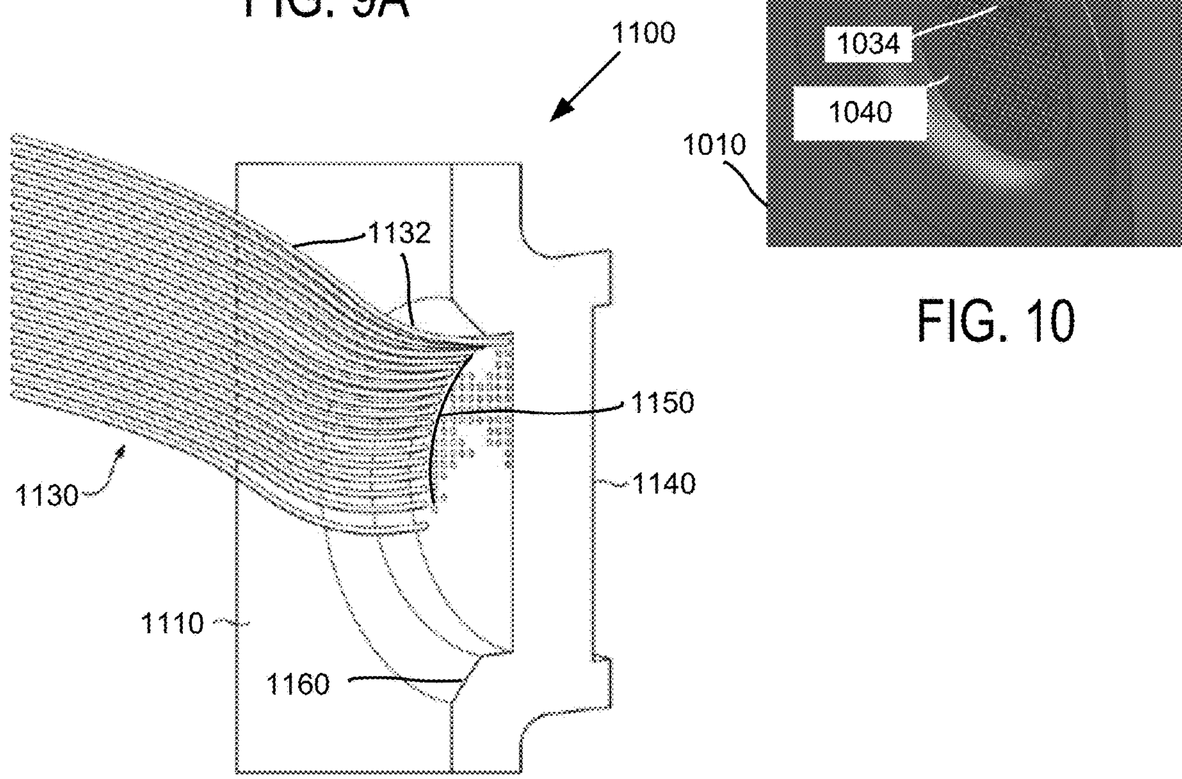
FIG. 10 illustrates an example heat transfer tube bending configuration.

FIG. 10 illustrates an example heat transfer tube bending configuration 1000, including an example tube sheet 1040 attached to a reactor vessel 1010. Tube sheet 1040 may be configured as a substantially vertical tube sheet. In other examples, tubes sheet 1040 may be configured as an inclined tube sheet. Heat transfer tubes 1030 may be configured or arranged as a set of helical shaped tubes that are inserted into, and/or otherwise fluidly coupled, mechanically coupled, or structurally coupled with, tube sheet 1040. A first set of transition bends 1032 may be configured to route heat transfer tubes 1030 from the helix portion of the steam generator system to a substantial vertical orientation. In some examples, first set of transition bends 132 may be contained in the same helical plane as the helical portion of heat transfer tubes 1030. Additionally, a second set of transition bends 1034 may be configured to route heat transfer tubes 1030 from the vertical orientation to a substantial horizontal orientation for insertion in tube sheet 1040.

In some examples, first and second sets of transition bends 1032, 1034 may be combined into a single compound bend that aligns heat transfer tubes 1030 with the through-holes of tube sheet 1040. A single compound bend may be configured to offer less resistance to insertion and withdrawal of an inspection probe into heat transfer tubes 1030.

Each vertical group of heat transfer tubes 1030 may be configured to transition to a horizontal row of through-holes in tube sheet 1040. The horizontal rows of through-holes in tube sheet 1040 may be arranged in a triangular pitch pattern to minimize the diameter of tube sheet 1040. In some examples, the diameter of tube sheet 1040 may be approximately two feet. Additionally, the distance or pitch between through-holes may be approximately one inch or less. A minimum tube bend radius of about six inches may be associated with tube bending configuration 1000 to route heat transfer tubes 1030 to tube sheet 1040. Additionally, a minimum tube spacing throughout transition bends 1032, 1034 may be approximately one quarter of an inch.

Figure 11:
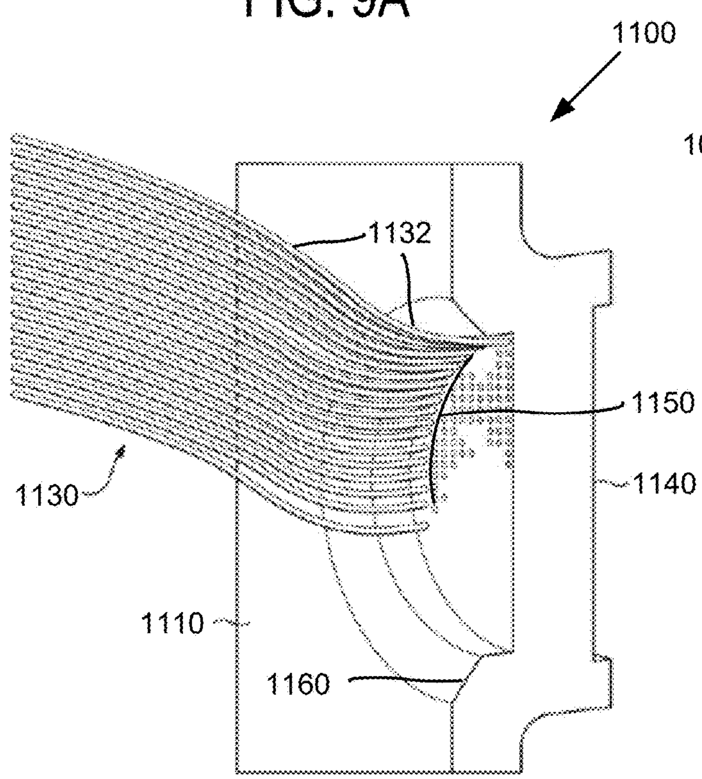
FIG. 11 illustrates another example heat transfer tube bending configuration.

FIG. 11 illustrates another example heat transfer tube bending configuration 1100, including an example tube sheet 1140 attached to a reactor vessel 1010. In some examples, tube sheet 1140 may comprise an integral tube sheet. Additionally, tube sheet 1140 may comprise a substantially circular tube sheet welded to a weld buildup on the inside surface of reactor vessel 1010. Tube sheet 1140 may comprise a substantially vertical plate, or an inclined plate, attached to the wall of the reactor vessel 1010. A plurality of heat transfer tubes 1130 may pass through a number of through-holes located in plenum 1100. In some examples, tube sheet 1140 may form a portion of the wall of reactor vessel 1010.

Assembly of heat transfer tubes 1130 may be performed inside reactor vessel 1010. Additionally, tube sheet 1140 may be lowered onto the ends of heat transfer tubes 1130 after the heat transfer tubes 1130 are assembled. Tube sheet 1140 may be used in conjunction with a second tube sheet located within the reactor vessel. For example, a first end of heat transfer tubes 1130 may be fluidly coupled and/or structurally coupled to tube sheet 1140 and a second end of heat transfer tubes 1130 may be fluidly coupled and/or structurally coupled to the second tube sheet. The second tube sheet may be located in approximately the same location within the reactor vessel as one or more of the upper tube sheets illustrated in the various figures herein. The second tube sheet and tube sheet 1140 may be welded to the reactor vessel prior to assembling the heat exchanger. In some examples, tube sheet 1140 may be welded to the reactor vessel with conventional nozzle insert type welds.

Reactor vessel 1010 may be inverted for tube assembly and the heat transfer tubes 1130 may be inserted into tube sheet 1140. One or more steam-end tube support cantilever beams may be welded to the underside of integral plate prior to tube assembly. Additionally, one or more feed-end tube support cantilever beams may be welded to the reactor vessel 1010 prior to tube assembly.

Assembly of the steam generator may proceed from the outermost column of tubes progressively to the innermost column of tubes, with the steam-end of the heat transfer tubes 1130 inserted into a tube sheet associated with an upper plenum, and the feed-end of the heat transfer tubes 1130 inserted into tube sheet 1140. Additionally, tube supports may be installed column by column during the heat exchanger assembly. The feed-end of the heat transfer tubes 1130 may be compressed during installation into tube sheet 1140.

Whereas bending configuration 1000 of FIG. 10 may be configured to transition each vertical group of heat transfer tubes from a helix orientation to a horizontal row of through-holes on the tube sheet, by first bending the tubes from the helix to a vertical orientation followed by a second bend to a horizontal orientation pointing toward the tube sheet, bending configuration 1100 may be configured by bending each vertical group of heat transfer tubes 1130 from the helix portion more directly as compared to bending configuration 1000, e.g., via a compound bend 1132 to an "arc" pattern 1150 on tube sheet 1140.

In some examples, each vertical group of heat transfer tubes 1130 may be configured to transition to the arc 1150 of through-holes on tube sheet 1140. The through-holes in tube sheet 1140 may be spaced more closely than the corresponding heat transfer tubes 1130 in the helical portion of the tube bundle.

In one or both of bending configuration 1000 of FIG. 10 and bending configuration 1100 of FIG. 11, some tube deformation may occur during assembly to bring the heat transfer tubes inside the reactor vessel and to position the tube ends for insertion through the tube sheet through-holes. Some of the following examples refer to various components illustrated in FIG. 11, however, other tube sheets and assemblies shown and/or described elsewhere in the application may be configured similarly, including those described at FIG. 10.

Heat transfer tubes 1130 may be configured in a manner that clears the rim 1160 of tube sheet 1140. In some examples, at least some of the heat transfer tubes 1130 may be configured to pass through the rim 1160 to provide for a more gradual bending transition. In still other examples, the tube sheet may be located at or inside the inner wall of the reactor vessel 1110 to effectively remove considerations of a rim.

If the tube sheet 1140 is assembled and welded to reactor vessel 1110 after tube assembly, any deformation to heat transfer tubes 1130 may be limited to placing the tubes inside the reactor vessel, which may be accomplished without incurring any tube plastic strain. In some examples, tube sheet 1140 may be fit into final position and welded after all the tubes are assembled in place. For example, all of the heat transfer tubes 1130 may be inserted into their respective through-holes prior to moving tube sheet 1140 to its final assembled position.

In still other examples, tube sheet 1140 may be temporarily fixed radially some distance outboard of its final installed location. With tube sheet 1140 positioned in this manner, heat transfer tubes 1130 may be individually assembled, with about one inch of the tube ends inserted into its corresponding through-hole in tube sheet 1140. This approach would essentially utilize tube sheet 1140 as a fixture to accurately locate the tube ends and facilitate their simultaneous insertion in the through-holes as the tube sheet 1140 is moved to its final installed position.

In various examples described herein, different heat exchanger geometries may be utilized. The heat exchanger may comprise tube lengths that are either unconstrained or constrained to some length, such as the maximum tube length. Additionally, in traversing from the feed tube sheets to the steam plenums, tubes exhibiting increments of one-fourth and three-fourth of full helix revolutions may be utilized.

In various examples described herein, such as those including a vertical tube sheet, there may be no protrusion inside the riser. Accordingly, the upper riser may be removed from the reactor vessel without disassembling the tube sheet assembly and/or steam generator assembly. Removal of the upper riser may facilitate access to inspect the inner region of the heat exchanger.

The tubes may be inserted into corresponding through-holes of the tube sheet, and they may be hydraulically expanded into the through-holes to create a tight fit-up and/or otherwise close any gap around the tubes. Additionally, the tubes may be welded to the tube sheet. In other examples, each tube may be full-penetration welded to a short cylindrical stub machined from a face of the tube sheet, similar to that described in one or more examples of U.S. Pat. No. 8,752,510, which is herein incorporated by reference in its entirety. In still other examples, a short tube segment may be attached to the tube sheet by expanding the tube segment into the through-hole and fillet welding the tube to the face of the tube sheet, and then butt welding the tube to this tube segment. The butt weld may be located approximately one inch from the face of the tube sheet.

Figure 12:
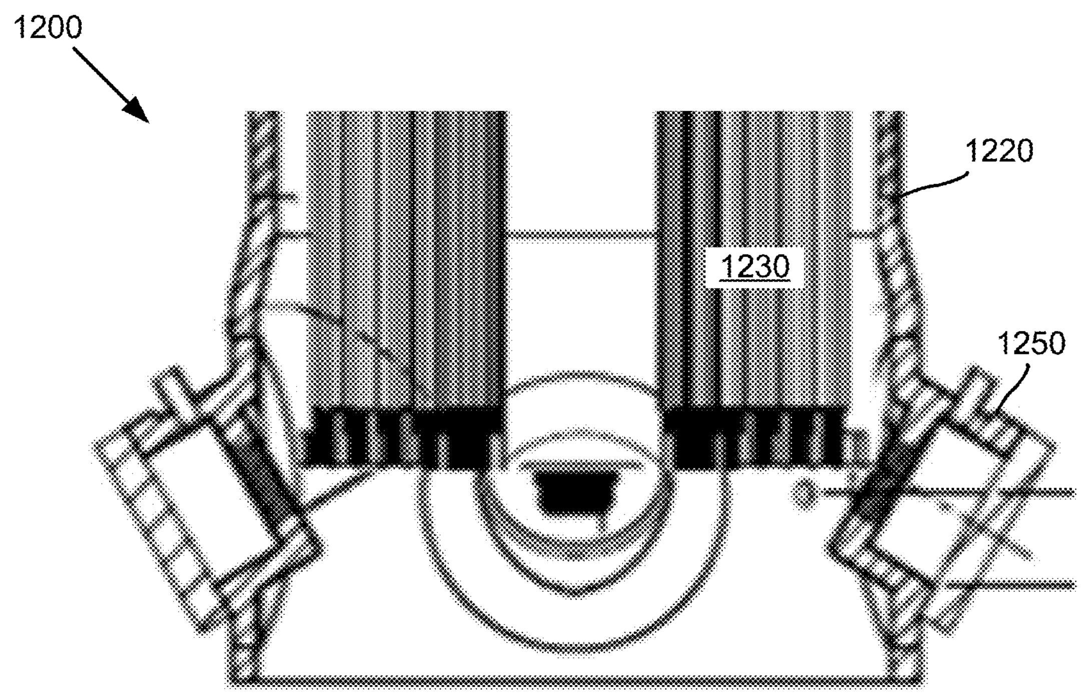
FIG. 12 illustrates a partial view of an example steam generation system comprising inclined tube sheets.

FIG. 12 illustrates a partial view of an example steam generation system 1200 comprising one or more inclined tube sheet assemblies 1250. The one or more inclined tube sheet assemblies 1250 may be separately welded to a reactor vessel 1220. Additionally, system 1200 may comprise one or more upper tube sheet assemblies, similar to upper plenum assemblies 600 of FIG. 6. The one or more upper tube sheet assemblies may comprise an integral tube sheet, similar to integral tube sheet 550 of FIG. 5.

System 1200 may comprise one or more steam generators 1230 configured to route the feed ends of heat transfer tubes radially outward to inclined tube sheet assemblies 1250. Steam generators 1230 may comprise helical coiled heat transfer tubes that occupy the annular region in an upper reactor vessel between the wall of reactor vessel 1220 and a riser assembly.

Figure 13:
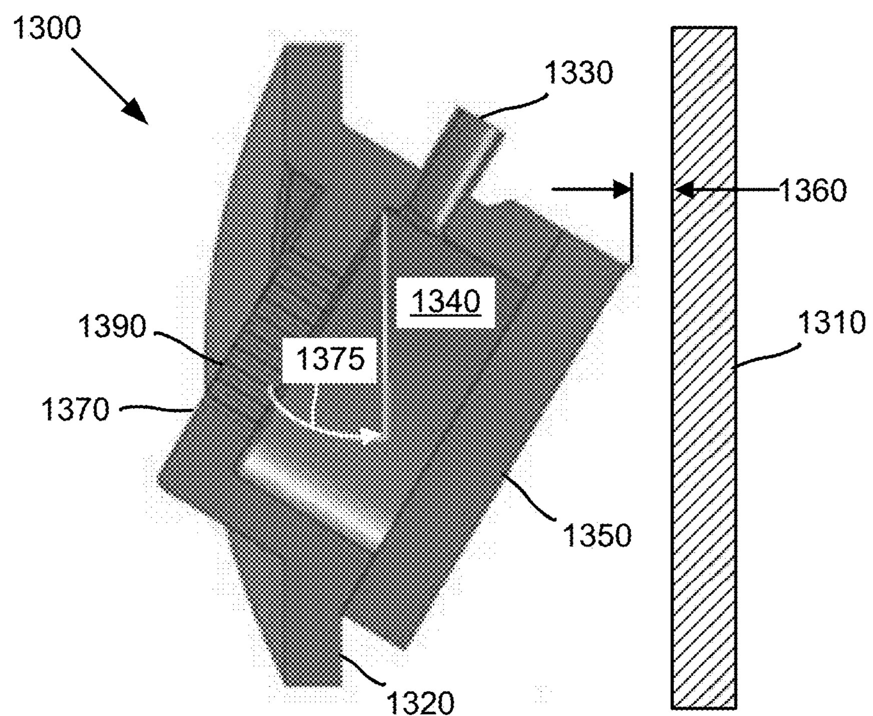
FIG. 13 illustrates a close up view of an example tube sheet assembly.

FIG. 13 illustrates a close up view of an example tube sheet assembly 1300, which may be configured similarly as the one or more inclined tube sheet assemblies 1250 of FIG. 12. Tube sheet assembly 1300 may comprise an inclined tube sheet 1370 with a plurality of through-holes 1390 or channels configured to pass secondary coolant through inclined tube sheet 1370 into the heat transfer tubes. Inclined tube sheet 1370 may comprise a tube sheet inclined at some angle of inclination 1375 between vertical and horizontal. The angle of inclination 1375 may be anywhere from ten degrees from vertical to eighty degrees from vertical. In some examples, the angle of inclination 1375 may be approximately thirty degrees from vertical. In still other examples, the angle of inclination 1375 may be approximately forty-five degrees from vertical.

Tube sheet assembly 1300 may comprise an inlet 1330 or feed nozzle configured to introduce secondary coolant into an access port 1340. Access port 1340 may be configured to transfer the secondary coolant into the heat transfer tubes. A flow control device, similar to flow control device 975 (FIG. 9) may be located adjacent inclined tube sheet 1370. In some examples, inclined tube sheet 1370 may be several inches or approximately one half of a foot in thickness. Additionally, inclined tube sheet 1370 may be substantially circular in shape.

Tube sheet assembly 1300 may comprise a cover plate 1350 configured to provide access to the interior portion of access port 1340. Tube sheet assembly 1300 may be located substantially or entirely within a containment vessel 1310. In some examples, cover plate 1350 may be removed from, and/or installed on, access port 1340 during one or more operations such as maintenance, inspection, and installation. Cover plate 1350 may be configured to fit entirely within containment vessel 1310. Additionally, cover plate 1350 may be configured to fit entirely outside a reactor vessel 1320.

A nominal clearance 1360 between an inner surface of containment vessel 1310 and cover plate 1350, or between the inner surface of containment vessel 1310 and one or more bolts used to secure cover plate 1350 to access port 1340, may be sized to accommodate thermal growth, expansion due to pressure, manufacturing tolerances, seismic motion, installation, maintenance, inspection, accessibility, and/or handling considerations of reactor vessel 1320 and/or the steam generator. In some examples, nominal clearance 1360 may be approximately one half inch. In other examples the nominal clearance 1360 may be between one and two inches.

Tube sheet assembly 1300 and/or inclined tube sheet 1370 may be attached and/or welded to reactor vessel wall 1320. The heat transfer tubes may be configured to transition from a steam generator assembly to inclined tube sheet 1370. A minimum tube bend radius of nine inches or less may be specified over the transition length. In some examples, the minimum tube bend radius may be approximately seven inches. Additionally, approximately one inch of the heat transfer tubes may be configured as a straight portion of tube that extends out of inclined tube sheet 1370 with a fully inserted heat tube. The straight length of tube may be configured to ensure that the start of the transition bend is located some distance from the face of inclined tube sheet 1370. Additionally, the straight length of tube may be configured to facilitate inspection of this expansion transition region of the heat transfer tubes.

Tube sheet assembly 1300 may be configured such that a first portion of inclined tube sheet 1370 may be located on a first side, or inside, of reactor vessel 1320 and a second portion of inclined tube sheet 1370 may be located on a second side, or outside, of reactor vessel 1320. In some examples, an approximate centerline of inclined tube sheet 1370 may be configured to intersect the wall of reactor vessel 1320 at the angle of inclination 1375. Additionally, tube sheet assembly 1300 may be configured such that a first portion of access port 1340 may be located inside of reactor vessel 1320 and a second portion of access port 1340 may be located outside of reactor vessel 1320.

Increased angles of inclination 1375 may effectively move the bottom of inclined tube sheet 1370 inward from the wall of reactor vessel 1320 and reduce the tube transition bend length since the terminal point of the tube may also be moved inward. Reduced tube transition bends may in turn operate to increase the minimum tube bend radius, since the angle through which the tube bends may be reduced. Inclined tube sheet 1370 may be configured to reduce and/or eliminate any tube deformation that might otherwise occur during tube assembly because the terminal point of the tube is moved inward and may result in less inward displacement of the tube to position the tube for insertion into the through-holes 1390 as compared to other configurations. Tube assembly strains associated with an inclined tube sheet may be less than the tube assembly stains associated with a vertical tube sheet.

Although FIG. 13 depicts the location of inlet 1330 at or near the top of access port 1340, inlet 1330 may otherwise be located at any location around the circumference of access port 1340 that has sufficient space or clearance. Having an inlet located at the bottom of 1340 access port could restrict or preclude steam from entering the feed line during any abnormal operating occurrences such as when a steam generator becomes dry. On the other hand, given the feed pipe routing which may run the common feed line below the elevation of access port 1340 where it may be split into the individual feed lines which run up to access port 1340, only a limited amount of steam can collect in the feed line with a top entry point.

In some examples, inlet 1330 may be oriented substantially vertically, rather than perpendicular to the wall of access port 1340 as shown in FIG. 13. Orienting inlet 1330 in the substantially vertically orientation may operate to direct the feed flow away from inclined tube sheet 1370 and/or any flow restrictor mounting plate or flow restrictors which may be located adjacent to inclined tube sheet 1370, and may further improve flow uniformity into the heat transfer tubes.

The tube sheet assembly 1300 may be configured to permit removal of an upper riser from within reactor vessel 1320 without disassembling the steam generator system. Similarly, tube sheet assembly 1300 may allow for the removal of reactor vessel 1320 from containment vessel 1310. In some examples, cover plate 1350 may be removed from access port 1340 after reactor vessel 1320 has been removed from containment vessel 1310. In other examples, nominal clearance 1360 provides sufficient spacing to remove cover plate 1350 while reactor vessel 1320 remains within containment vessel 1310. In still other examples, cover plate 1350 may be removed from access port 1340 after a lower portion of containment vessel 1310 located adjacent to access port 1340 has been removed from the upper portion of containment vessel 1310.

The thermal performance and/or efficiencies associated with an inclined tube sheet, such as vertical tube sheet 970 or inclined tube sheet 1370, may be greater than a tube sheet located in a generally horizontal orientation. An increase in heat transfer area may be due, in part, to an increase in height of the helical portion of the heat exchanger and/or an increase in tube length. Both the vertical and inclined tube sheet designs may eliminate the plenum to feed port and plenum to end cap welds and therefore may use fewer welds than a horizontally oriented tube sheet. In some examples, the vertical and inclined tube sheet designs may also provide a more efficient cross flow in the tube transition region and/or may reduce flow losses in the flow path.

Additionally, an inclined tube sheet design may reduce tube assembly strain and reduce the length of the tube transition bends. Tube assembly plastic strain may be avoided or reduced by first assembling the tubes in place and then inserting the plenums over the assembled tube ends. The tube sheet may be welded to the reactor vessel prior to tube assembly. In other examples, the tubes may be inserted into the tube sheet first and then the tube sheet may be slid over the assembled tube ends.

Figure 14:
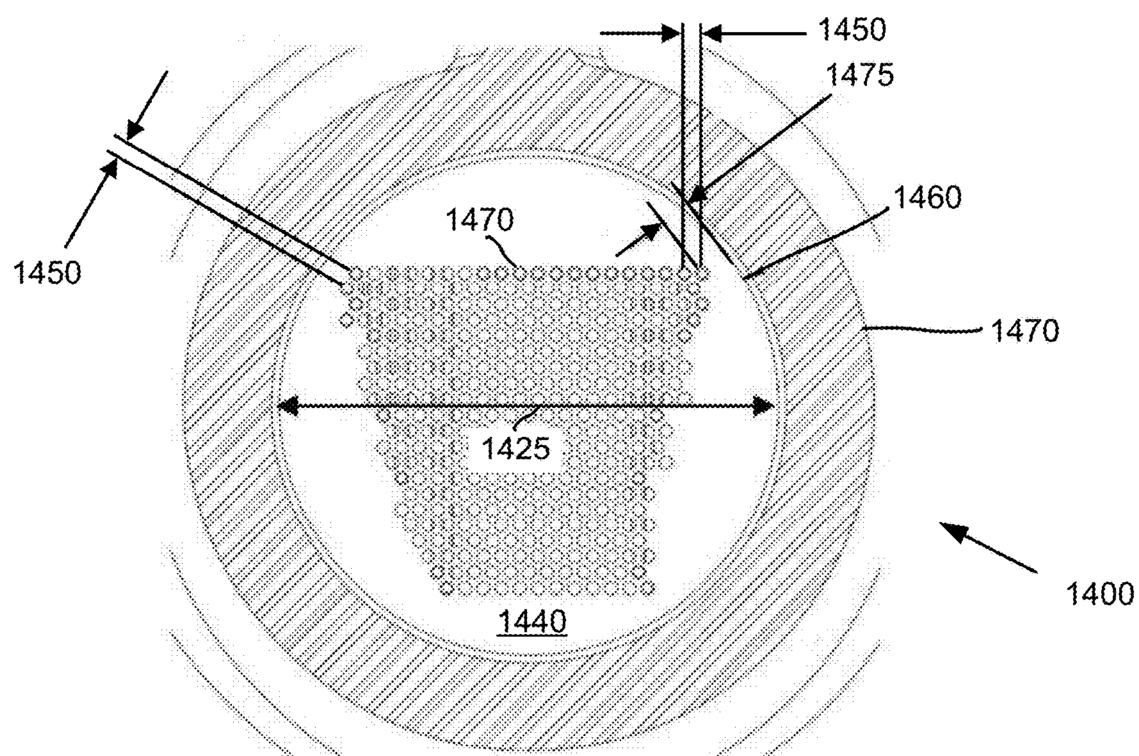
FIG. 14 illustrates a tube sheet assembly with an example hole pattern.

FIG. 14 illustrates a tube sheet assembly 1400 with an example hole pattern 1470 for a plurality of heat transfer tube through-holes on a tube sheet 1440. Hole pattern 1470 may be configured to be fluidly coupled and/or structurally coupled to heat transfer tubes bent from a helix-shaped steam generator system to a vertical orientation. In some examples, a vertical group of tubes in the helix transitions to a horizontal row of tubes on tube sheet 1440.

To minimize the diameter 1425 of tube sheet 1440, the horizontal rows of holes may be arranged in a triangular pitch pattern with a pitch 1450, or spacing between holes. The pitch 1450 between any three adjacent through-holes in the triangular pitch pattern may be the same. In some examples, pitch 1450 may be between one-fourth of an inch and one inch, and diameter 1425 may be approximately two feet. Pitch 1450 may be sized to space the heat transfer tubes more closely in the tube sheet 1440 than the heat transfer tubes are spaced in the helical tube bundle. Accordingly, the tube spacing may vary continuously throughout the transition bend region from the helix to tube sheet 1440.

Tube sheet 1440 may comprise a substantially circular plate 1460 through which hole pattern 1470 is formed. A tube clearance 1475 may be maintained between the outermost through-hole and the outer edge of plate 1460. Tube sheet assembly 1400 may comprise a flanged portion 1470 or mounting structure for attaching tube sheet 1440 to a reactor vessel wall. In some examples, hole pattern 1470 may be associated with a heat transfer tube bending configuration such as tube bending configuration 1000 of FIG. 10.

Figure 15:
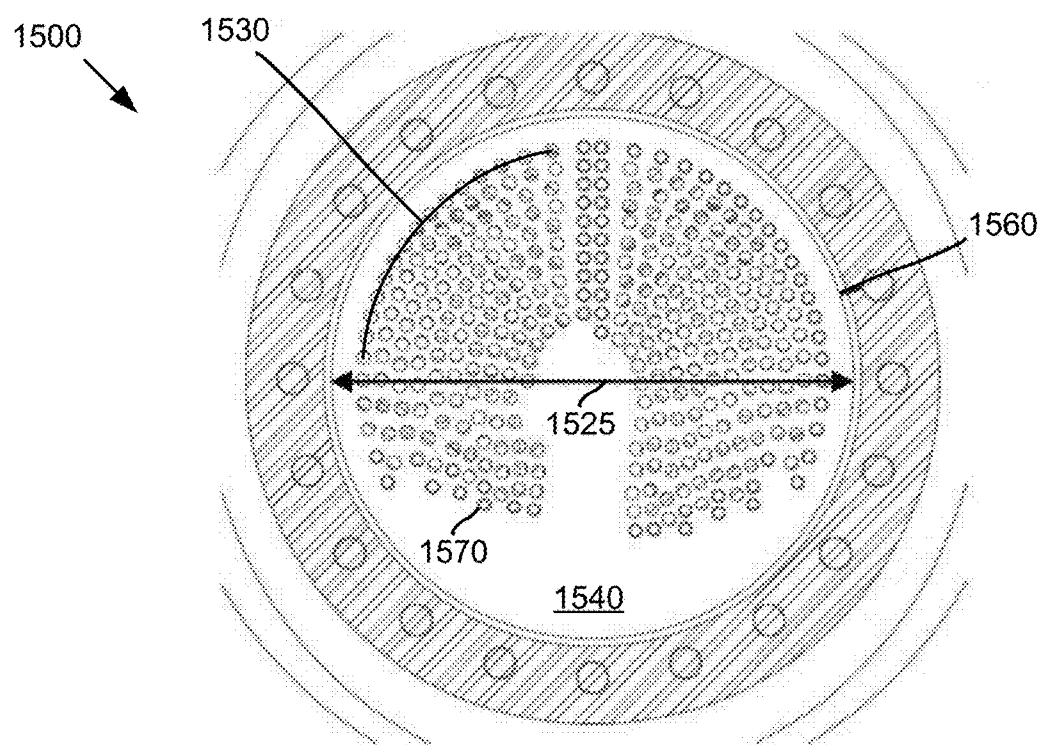
FIG. 15 illustrates a tube sheet assembly with a further example hole pattern.

FIG. 15 illustrates a tube sheet assembly 1500 with a further example hole pattern 1570 for a plurality of heat transfer tube through-holes on a tube sheet 1540. Hole pattern 1470 may be configured to be fluidly coupled and/or structurally coupled to heat transfer tubes bent radially outward from the helix for fit-up to the tube sheet 1540. Tube sheet 1540 may comprise a substantially circular plate 1560 having a diameter 1525 of approximately two feet.

Each vertical group of tubes in the helix may be configured to transition to a vertical arc 1530 of tube holes on tube sheet 1540. The tube holes may be spaced from each other by a ligament or span of between one-fourth of an inch and one inch. In some examples, hole pattern 1570 may be associated with a heat transfer tube bending configuration such as tube bending configuration 1100 of FIG. 11.

Figure 16:
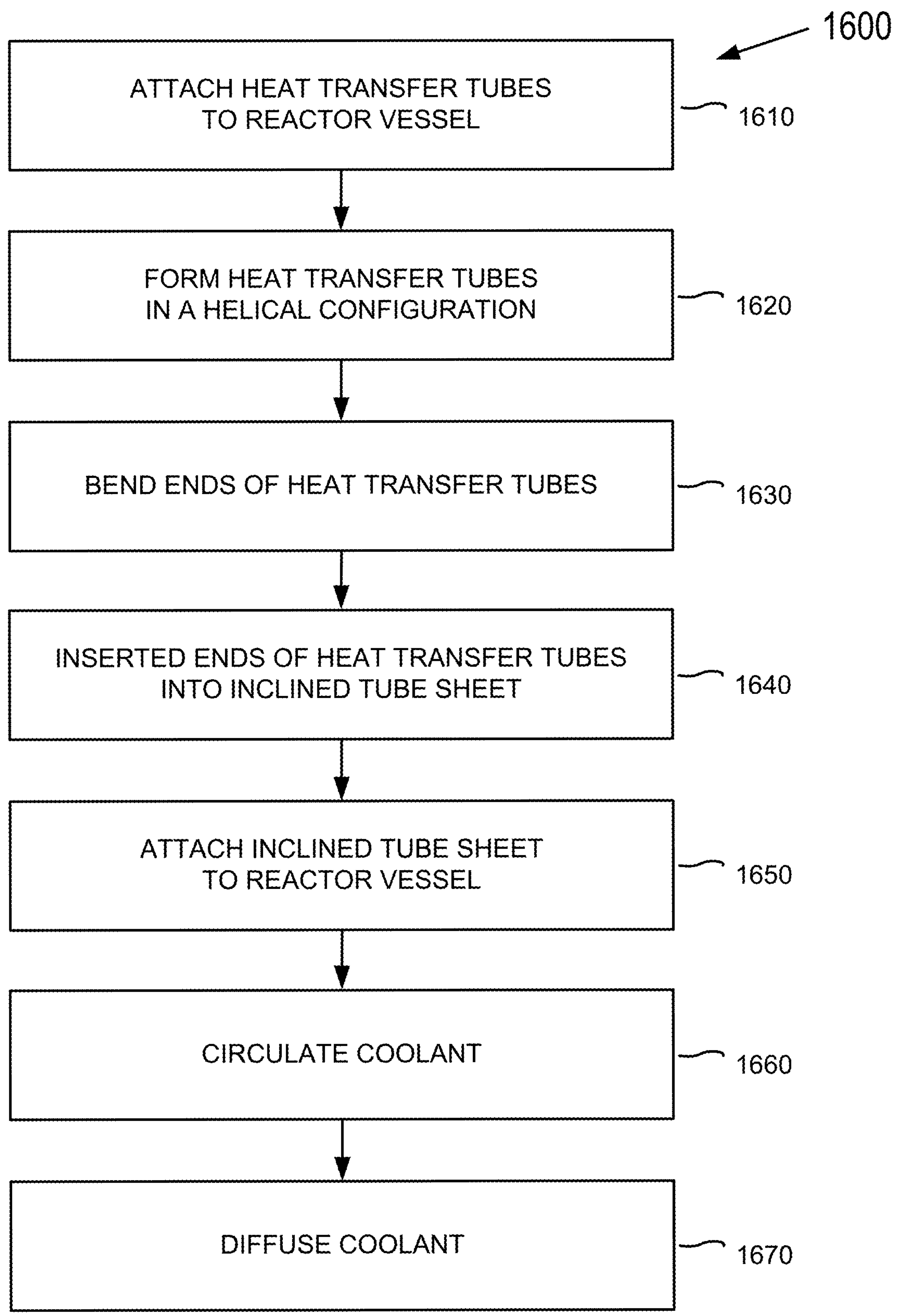
FIG. 16 illustrates an example process for assembling a steam generator.

FIG. 16 illustrates an example process for assembling a steam generator. At operation 1610, a plurality of heat transfer tubes may be attached to a first half of a reactor vessel. In some examples, the heat transfer tubes may be attached to the reactor vessel at a tube sheet located at or near one or more upper plenums of the reactor vessel. The reactor vessel may be configured to house a primary coolant. Heat generated from within the reactor vessel may be transferred from the primary coolant to a secondary coolant that is circulated through the plurality of heat transfer tubes. In some examples, the primary coolant and secondary coolant is not allowed to fluidly mix with each other at any time.

At operation 1620, the plurality of heat transfer tubes may be formed into a helical shaped configuration comprising vertical groups of tubes, similar to that described in one or more examples of U.S. Pat. No. 8,752,510, which is herein incorporated by reference in its entirety. The vertical groups, or columns, of tubes may be concentrically arranged about a riser column within the reactor vessel. An outer group of tubes located near the wall of the reactor vessel may be associated with a larger radius of curvature than an inner group of tubes located near the wall of the riser column.

At operation 1630, tube insertion ends of the plurality of heat transfer tubes may be bent in at least two directions. A first set of transition bends may be configured to route the heat transfer tubes from the helix portion of the steam generator system to a substantial vertical orientation. In some examples, the first set of transition bends may be contained in the same helical plane, or column, as the helical portion of the heat transfer tubes. Additionally, a second set of transition bends may be configured to route the heat transfer tubes from the vertical orientation to a substantial horizontal orientation for insertion in the tube sheet.

In some examples, each vertical group of heat transfer tubes may be configured to transition to a horizontal row of through-holes in the tube sheet. In other examples, each vertical group of heat transfer tubes may be configured to transition to an arc of through-holes on the tube sheet. Two or more of the transition bends may be combined into a single compound bend that aligns heat transfer tubes with the through-holes of the tube sheet.

At operation 1640, the tube insertion ends of the plurality of heat transfer tubes may be inserted into, or otherwise attached to, an inclined tube sheet to fluidly couple and/or structurally couple the plurality of heat transfer tubes to the inclined tube sheet. The ends of the heat transfer tubes may be welded to the inclined tube sheet. Each of the heat transfer tubes may be associated with a separate through-hole that passes through the inclined tube sheet.

At operation 1650, the inclined tube sheet may be attached to a second half of the reactor vessel in a non-horizontal orientation. The inclined tube sheet may be located within one or more lower plenums of the reactor vessel. One or both of the inclined tube sheet and or plenums may be welded to the wall of the reactor vessel. In some examples, the inclined tube sheet may be attached to the reactor vessel in a substantially vertical orientation. In other examples, the inclined tube sheet may be attached to the reactor vessel at an approximately thirty degree angle from vertical. However, other angles of attachment are contemplated herein as being greater than horizontal, up to and including the vertical orientation.

At operation 1660, secondary coolant may be circulated through the heat transfer tubes to remove heat generated by the reactor vessel. The heat transfer tubes may pass through the primary coolant located within the reactor vessel. The heat associated with the primary coolant may pass through the walls of the heat transfer tubes and be transferred to the secondary coolant contained within the heat transfer tubes.

At operation 1670, a flow distributor may be configured to diffuse the secondary coolant that is transferred from the inclined tube sheet to the heat transfer tubes. The flow distributor may comprise a perforated structure. The flow distributor may be located adjacent the inclined tube sheet and further may be located in a lower plenum of the reactor vessel.

In addition to operating with a pressurized water reactor and/or a light water reactor, it should be apparent to one skilled in the art that at least some of the examples provided herein may be understood to also apply to other types of power systems. For example, one or more of the examples or variations thereof may also be made operable with a boiling water reactor, sodium liquid metal reactor, gas cooled reactor, pebble-bed reactor, and/or other types of reactor designs. It should further be noted that any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A system comprising:

a nuclear reactor vessel that is configured to house a primary coolant; and a steam generation system thermally coupled to the nuclear reactor vessel, the steam generation system including:

a plurality of heat transfer tubes configured to circulate a secondary coolant of the steam generation system, wherein heat generated from within the nuclear reactor vessel is transferred from the primary coolant to the secondary coolant; and a tube sheet assembly attached to an outer surface of the nuclear reactor vessel, the tube sheet assembly comprising:

a tube sheet fluidly coupled to the plurality of heat transfer tubes, wherein tube sheet is integrated with a reactor vessel wall of the nuclear reactor vessel in a non-horizontal orientation; and an access port wall defining a plenum that substantially surrounds an exterior face of the tube sheet, the access port wall having a first side defining an opening for a nozzle and a second different side defining an attachment for an access plate to provide access to the exterior face of the tube sheet.

2. The system of claim 1, wherein the tube sheet comprises a plurality of through-holes that pass through the exterior face of the tube sheet, and wherein the tube sheet is integrated with the nuclear reactor vessel wall and the exterior face of the tube sheet forms an attachment angle with the reactor vessel wall that is less than 60 degrees.

3. The system of claim 2, wherein the attachment angle between the exterior face of the tube sheet and the reactor vessel wall is between 15 and 45 degrees.

4. The system of claim 2, wherein the attachment angle between the exterior face of the tube sheet and the reactor vessel wall is approximately 30 degrees.

5. The system of claim 3, wherein a first portion of the exterior face of the tube sheet is located outside of the reactor vessel wall and wherein a second portion of the face of the exterior tube sheet is located inside of the reactor vessel wall.

6. The system of claim 1, wherein the nuclear reactor vessel is configured to prohibit the release of primary coolant out of the nuclear reactor vessel, and wherein the primary coolant and the secondary coolant are not allowed to mix.

7. The system of claim 1, wherein the tube sheet comprises a plurality of through-holes that pass through an interior face of the tube sheet and extend to the exterior face of the tube sheet, and wherein the plurality of heat transfer tubes are fluidly coupled to the tube sheet at the interior face.

8. The system of claim 7, wherein the plurality of through-holes are arranged at the interior face of the tube sheet in a triangular pitch pattern.

9. The system of claim 7, wherein at least a portion of the plurality of through-holes are arranged as a number of horizontal rows of through-holes, wherein at least a portion of the plurality of heat transfer tubes are arranged as a vertical column of tubes, and wherein the vertical column of tubes transitions to a horizontal row of through-holes in the tube sheet.

10. The system of claim 7, wherein at least a portion of the plurality of through-holes are arranged as a number of concentric arcs of through-holes, wherein at least a portion of the plurality of heat transfer tubes are arranged as a vertical column of tubes, and wherein the vertical column of tubes transitions to an arc of through-holes in the tube sheet.

11. The system of claim 7, wherein the plenum is spaced apart from an adjacent containment structure to allow for thermal expansion of the nuclear reactor vessel housed within the containment structure.

12. The system of claim 11, wherein the plenum is spaced apart from the adjacent containment structure by at least one-half inch and less than two inches.

13. The system of claim 1, wherein the heat transfer tubes are arranged within the nuclear reactor vessel in a helix-shaped configuration, and wherein tube insertion ends of the heat transfer tubes are bent in at least two directions in transitioning from the helix-shaped configuration to the tube sheet.

14. The system of claim 1, further comprising:

a flow distributor located in the plenum adjacent to the tube sheet, the flow distributor to regulate a flow of the secondary coolant from the inlet to a plurality of through-holes that pass through the tube sheet.

15. The system of claim 14, wherein the flow distributor comprises a perforated structure.

16. The system of claim 1, wherein the access port wall extends orthogonally from the outer surface of the nuclear reactor vessel or from the exterior face of the tube sheet.

17. The system of claim 1, wherein the tube sheet assembly comprises a flange, wherein the tube sheet assembly is attached to the outer surface using the flange.

18. The system of claim 1, wherein the attachment for the access plate comprises one or more openings to receive one or more bolts, respectively.

19. A system comprising:

means for circulating a secondary coolant of the steam generation system, wherein the means for circulating is thermally coupled to a nuclear reactor vessel that is configured to house a primary coolant, and wherein heat generated from within the nuclear reactor vessel is transferred from the primary coolant to the secondary coolant; and a tube sheet assembly attached to an outer surface of the nuclear reactor vessel, the tube sheet assembly comprising:

a tube sheet fluidly coupled to the means for circulating, wherein the tube sheet is integrated with a reactor vessel wall of the nuclear reactor vessel in a non-horizontal orientation; and an access port wall defining a plenum that substantially surrounds an exterior face of the tube sheet, the access port wall having a first side defining an opening for a nozzle and a second different side defining an attachment for an access plate to provide access to the exterior face of the tube sheet.

20. The steam generation system of claim 19, further comprising:

means for diffusing the secondary coolant, wherein the means for diffusing is located within the plenum, and wherein the means for diffusing is configured to evenly distribute the secondary coolant to a plurality of through-holes of the sheet tube.

21. The steam generation system of claim 19, wherein the tube sheet comprises a plurality of through-holes that pass through the exterior face of the tube sheet, wherein the tube sheet is integrated with the reactor vessel wall with a first portion of the exterior face of the tube sheet located outside of the reactor vessel wall, and wherein a second portion of the face of the tubes sheet is located inside of the reactor vessel wall.

22. The steam generation system of claim 18, wherein the access port wall extends orthogonally from the outer surface of the nuclear reactor vessel or from the exterior face of the tube sheet.

* * * * *

UNITED STATES PATENT AND TRADEMARK OFFICE

CERTIFICATE OF CORRECTION

PATENT NO. : 10,685,752 B2
APPLICATION NO. : 14/618701
DATED : June 16, 2020
INVENTOR(S) : Tamas Liszkai It is certified that error appears in the above-identified patent and that said Letters Patent is hereby corrected as shown below:

In the Specification

In Column 17, Line 29, delete "and or" and insert -- and/or --, therefor.

In the Claims

In Column 18, Line 21, in Claim 1, after "wherein" insert -- the --.

In Column 19, Line 36, in Claim 19, before "system" insert -- steam generation --.

In Column 20, Line 34, in Claim 22, delete "18," and insert -- 19, --, therefor.

Signed and Sealed this
Twentieth Day of October, 2020

Andrei Iancu
*Director of the United States Patent and Trademark Office*